United States Patent [19]

Hlavinka et al.

[11] Patent Number: 5,172,781

[45] Date of Patent: Dec. 22, 1992

[54] SCALE FOR FLUIDIZED BED AND METHOD FOR USING SAME

[75] Inventors: Dennis J. Hlavinka, Lakewood, Colo.; Douglas S. Harris, Scarborough; Burt L. Swersey, Stephentown, both of N.Y.

[73] Assignee: Kinetic Concepts, Inc., San Antonio, Tex.

[21] Appl. No.: 816,855

[22] Filed: Jan. 2, 1992

Related U.S. Application Data

[63] Continuation of Ser. No. 691,176, Apr. 24, 1991, which is a continuation of Ser. No. 428,226, Oct. 27, 1989.

[51] Int. Cl.$^5$ .................. G01G 19/52; A61G 7/00; A47C 27/08
[52] U.S. Cl. ........................... 177/144; 5/449; 5/453
[58] Field of Search ............ 177/144; 5/60, 449, 5/453

[56] References Cited

U.S. PATENT DOCUMENTS

| | | |
|---|---|---|
| 3,866,606 | 2/1975 | Hargest . |
| 4,023,633 | 5/1977 | Swersey et al. . |
| 4,281,730 | 8/1981 | Swersey et al. . |
| 4,425,676 | 1/1984 | Crane ........................ 5/453 X |
| 4,483,029 | 11/1984 | Paul . |
| 4,487,276 | 12/1984 | Swersey et al. . |
| 4,498,205 | 2/1985 | Hino . |
| 4,551,882 | 11/1985 | Swersey et al. . |
| 4,564,965 | 1/1986 | Goodwin . |
| 4,609,854 | 9/1986 | Yamamoto et al. . |
| 4,629,015 | 12/1986 | Fried et al. . |
| 4,637,083 | 1/1987 | Goodwin . |
| 4,768,250 | 9/1988 | Kato . |
| 4,793,428 | 12/1988 | Swersey ........................ 177/144 |
| 4,807,558 | 2/1989 | Swersey . |

Primary Examiner—George H. Miller, Jr.

[57] ABSTRACT

A fluidized bead bed having a scale integrated into the frame of the bed for providing a continuous readout of the weight of a patient supported on the upper surface of the bed. The bed includes a fluidized bead bed support mounted atop a frame such that a torque, corresponding to the supported, load is transmitted to the beam arms cantilevered from each end of the frame and extending to the longitudinal median of the bed along one side thereof. Springs oppose the torque and LVDT's are provided at the distal ends of the arms to produce an electrical signal with pulses of an amplitude related to the weight of the patient on the bed. The distal ends of both beam arms are protected and confined in their movements by a lower guard in the form of a single U-shaped channel, and the springs are mounted to the frame by means of upstanding supports on the top surface thereof. A control panel incorporates a signal processor for providing an accurate but readable output based on the LVDT signals. The processor includes a synchronous detector, an analog low-pass filter, an A/D converter, and a digital filter. The digital filter effectuates a highly weighted average characterized by a filter coefficient which is ordinarilly 128 but may be automatically or selectively decreased in order to quicken an accurate readout following a rapid weight change.

11 Claims, 3 Drawing Sheets

SCALE FOR FLUIDIZED BED AND METHOD FOR USING SAME

This application is a continuation of copending application Ser. No. 07/691,176 filed on Apr. 24, 1991, which was a continuation of copending application Ser. No. 07/428,226 filed on Oct. 27, 1989.

CROSS-REFERENCE TO RELATED APPLICATION

The present application is related to Applicant's copending U.S. patent application Ser. No. 217,685 which was filed Jul. 11, 1988 and entitled IMPROVED FLUIDIZED BEAD BED, in that the present application relates to a scale for the apparatus disclosed and claimed therein. Said Ser. No. 217,685 is incorporated herein in its entirety by this specific reference thereto.

BACKGROUND OF THE INVENTION

1. Field of the Invention

The present invention relates to a scale for what is known as a bead bed and, more specifically, to a scale which is integrated into the frame of such a bed.

2. Background

Many patients, such as burn victims and immobile patients, must remain in bed for extended periods of time. When such patients lie on a conventional mattress, most of the patient's weight is born by protuberances of the posterior surface of the body such as the heels, the buttocks, the scapulae, and the occipital region of the head. As a result, the relatively small areas of soft tissue at such points are subjected to localized high pressures. When such localized pressures become great enough, the patient's small capillaries and veins in the tissue may collapse, causing pressure sores, decubitus ulcers and other circulatory complications. Burn patients may also risk extraction of skin grafts due to shearing or rubbing against the surface of a conventional mattress.

In order to overcome those problems and others, hospital beds have been developed which use fluidized granular material (preferably spherical beads coated with silicone) as a supporting medium in order to uniformly distribute the supporting pressure points along the body surface, thus reducing the pressure at the aforementioned critical areas. Beds employing such fluidized granular material are commonly referred to as "air fluidized" or "bead" beds.

Air fluidized beds typically comprise a tank partially filled with a substantial mass of granular material, such as spherical beads of fine soda ash coated with silicone to inhibit lumping. The granular material is supported directly on top of a diffuser board, and a flexible, loose fitting sheet such as a woven nylon, which is highly permeable to air but not the granular material, is laid on top of the granular material to form a patient support surface. Air is blown through the diffuser board into the granular material. Thence the gas flows (or bubbles) upwardly through the granular material and out the top of the tank through the cover sheet, thereby fluidizing the material so that a patient laying on the support surface is buoyantly suspended upon the bed. When the granular material is not being fluidized, the material settles down into a solid structure and contours to the body of a patient lying on the bed.

Fluidization of a bead bed evenly distributes the forces imparted on a patient's body and, as a result, the chance of circulatory complications such as decubitus ulcers is greatly reduced. Comfort for a supported patient is also enhanced, and movement of the fluidized support medium with the body helps to reduce the likelihood of skin graft extraction by eliminating or reducing shear. Also, the structure of such bead beds allows body fluids exuded from wounds to flow through the covering support surface and into the granular material away from the patient, quickening the healing process. The pH of the beads acts as an antibacterial agent and is not considered a good environment for bacteria.

Disclosure of such bead beds along with various features thereof can be found in U.S. Pat. Nos. 3,428,973; 3,485,240; 3,866,606; 4,498,205; 4,483,029; 4,564,965; 4,637,083; and 4,768,250. Said U.S. patents are incorporated herein in toto as examples of air fluidized beds which could use scales such as disclosed herein.

As is known to have been done with hospital beds, it has been considered desirable to equip such beds with a scale so that a patient supported thereon could be weighed in bed. The prior art includes a variety of scales for use in conjunction with hospital beds in general. For example, it has been known to provide scales, such as described in U.S. Pat. No. 4,281,730, onto which a hospital bed can be rolled in order to indirectly weigh the patient supported on the hospital bed. Other scales, such as described in U.S. Pat. No. 4,487,276, can be slid into place between a bed-ridden patient and a mattress in order to weight the patient. Another type of scale has employed load cell arrangements which require lowering of the patient support section of the bed onto load zone in order to weigh the patient. Still other scales, such as that disclosed in U.S. Pat. No. 4,793,428, have disclosed hospital beds with scale assemblies incorporated into the bed between the bed support frame and the patient supporting sections. Other examples of scales incorporated into the frames of various structures are disclosed in U.S. Pat. Nos. 4,023,633; 4,281,730; 4,487,276; 4,551,882; 4,629,015; 4,793,428; and 4,807,558, each of which are specifically incorporated herein by this reference in their entirety for any purposes of the disclosure of the present invention. Each of such types of scales have been somewhat effective for their intended purposes but either require some degree of movement of the patient or, when integrated into the structure almost inherently add some degree of instability to that structure.

The integration of a scale into a hospital bed is quite beneficial, especially for the purpose of weighing bed-ridden patients who are otherwise not able to stand on a conventional scale or who must be lifted from the bed with a sling or similar device to weigh. Movement of the patient is often difficult and may strain or injure medical personnel and may disturb or injure patient. Unfortunately, though, scales have not previously been integrated into the frame of a bead bed. Apparently, a reason for this is that the extreme weight of bead beds requires an exceptionally sturdy supporting frame. Common bead beds weigh almost a ton due to the great bulk of granular material that is required to evenly distribute the loads and fluidization beneath a supported patient. The great density of the commonly used granular materials also contributes to the weight of bead beds. Consequently, the added instabilities and weaknesses which are virtually inherent with bed scales have led those skilled in the art away from employing such scales in the frame of a bead bed.

Bead beds also present several obstacles relating to the required high sensitivity of a scale incorporated therein. Patient scales must be very accurate to give beneficial and useful indicators of weight change. Because of the great weight of a bead bed, a scale incorporated in the frame of a bead bed must be extra sensitive in order to accurately detect the relatively lesser weights of patients supported on the upper surface of the bed. In complete opposition to such sensitivity, though, the fluidization of a bead bed creates extraordinary vibrations due to ongoing displacement and re-displacement of masses of the granular material in tank 9 as air is bubbled therethrough. Vibrations are also caused by pinging due to the continuous collisions of the many tiny beads. Such vibrations caused by fluidization are far more significant than in other air beds such as low air loss beds. Additionally, any vibrations or waves encountered in a bead bed (including those originating from a patient thereon) are transmitted much more easily and perceivably through the solid granular material of bead beds than through the fluidized mediums of other hospital beds. To those skilled in the art of bead beds, such factors have made incorporating a scale in the frame of a bead bed for accurate weighing of the patient in situ seemingly impossible.

As a result, the only scales which have been considered feasible for employment in conjunction with beads beds have been those which are inserted above the granular material. Such insertable scales, though, inevitably interrupt or otherwise interfere with fluid flow between the granular material and the patient, and vice versa. Use of insertable scales also requires some movement of the patient in order to insert the scale beneath the patient's body, which inherently increases the risks of injury to such patients.

In sum, for a variety of reasons including the numerous factors opposing integration of a scale into the frame of a fluidized bead bed, those skilled in the art have been directed away from and, instead, have relegated themselves to the more cumbersome and more hazardous techniques of the prior art.

SUMMARY OF THE INVENTION

Accordingly, it is an object of the present invention to provide a fluidized bead bed with an integrated scale in a cost-effective manner which results in a structurally sound bed and provides an accurate measurement of the weight of a patient lying therein.

It is another object of the present invention to incorporate such a scale into a fluidized bead bed while minimizing interference with normal operation of such a bed.

Another object is to provide a bead bed scale which produces a quick but accurate reading of the weight of a patient lying therein.

Another object is to provide a bead bed scale which can be retrofitted into existing bead beds and bead bed designs without affecting the design or operation of the beds.

It is yet another object of the present invention to overcome the problems encountered by the prior art.

To address such objects and others, the present invention provides a bead bed adapted for weighing a patient lying thereon which comprises a bead bed support that is mounted atop a frame which, itself, has a scale integrated therewith for determining the weight of the patient. The scale includes a signal emitter in the form of an LVDT that is mounted to the frame for emitting signals representative of the patient's weight. In addition, a signal processing means is provided for determining the weight of the patient based on the signals emitted by the LVDT.

In accordance with the invention, the signal processing means may include means for filtering the LVDT signals through a weighted average which is characterized by a coefficient k according to the formula: $V'_n = |(k-1)V'_{n-1} + V_n|/k$. The value for the coefficient k is greater than or equal to the integer 16 and may normally have a value of 128. Further, the signal processing means may include further means for temporarily reducing the value of the coefficient k for a variety of advantages. The value of the coefficient k can also be selectively varied from a first value (such as 128) which is equal to or greater than 100 to a second value which is less than 100 (such as the value 16). Means is also provided for automatically or selectively adjusting the processor to utilize the second, lower value for a temporary period of time upon the depression of a button on a control panel.

The signal processing means of the bed also includes a synchronous detector, a low-pass filter, an A/D converter, and a digital processor which combines to produce accurate and readable output for an operator of the bed. Such output is accomplishes through means which provides a continuous readout of the weight for the operator.

The integration of the scale and the frame particularly includes a support frame, a load frame, a pair of displacement transmitting members and a plurality of flexures for connecting those elements in a manner which enables pivoting and provides a torque on the displacement transmitting members under an applied weight supported by the bed. A pair of beam arms, each being secured to one of the displacement transmitting members at an end thereof, pivot about horizontal axis and are restrained at their distal ends by a pair of springs elastically connecting the distal ends to the load frame. The springs are oriented about vertical axis to provide a proportionality between the output of the LVDT and the weight of a patient on the bead bed. A plurality of horizontally oriented plates and platforms (which are slightly spaced above the plates) are also provided. Limit means are provided to limit the upward and downward movement of the distal ends of the beam arms, and a U-shaped channel is centrally provided on the frame for restricting lateral movement of those distal ends.

The apparatus, itself, evidences a method of the invention for processing analog signals produced by such a scale.

These and other objects, features and advantages of the invention will be evident to those of ordinary skill in the art from the foregoing and following descriptions taken in light of the prior art and in conjunction with the accompanying drawings, wherein:

DETAILED DESCRIPTION OF THE PREFERRED EMBODIMENT

FIGS. 1-4 show a preferred embodiment of a fluidized bead bed 10 constructed according to the teachings of the present invention.

Figure 1:
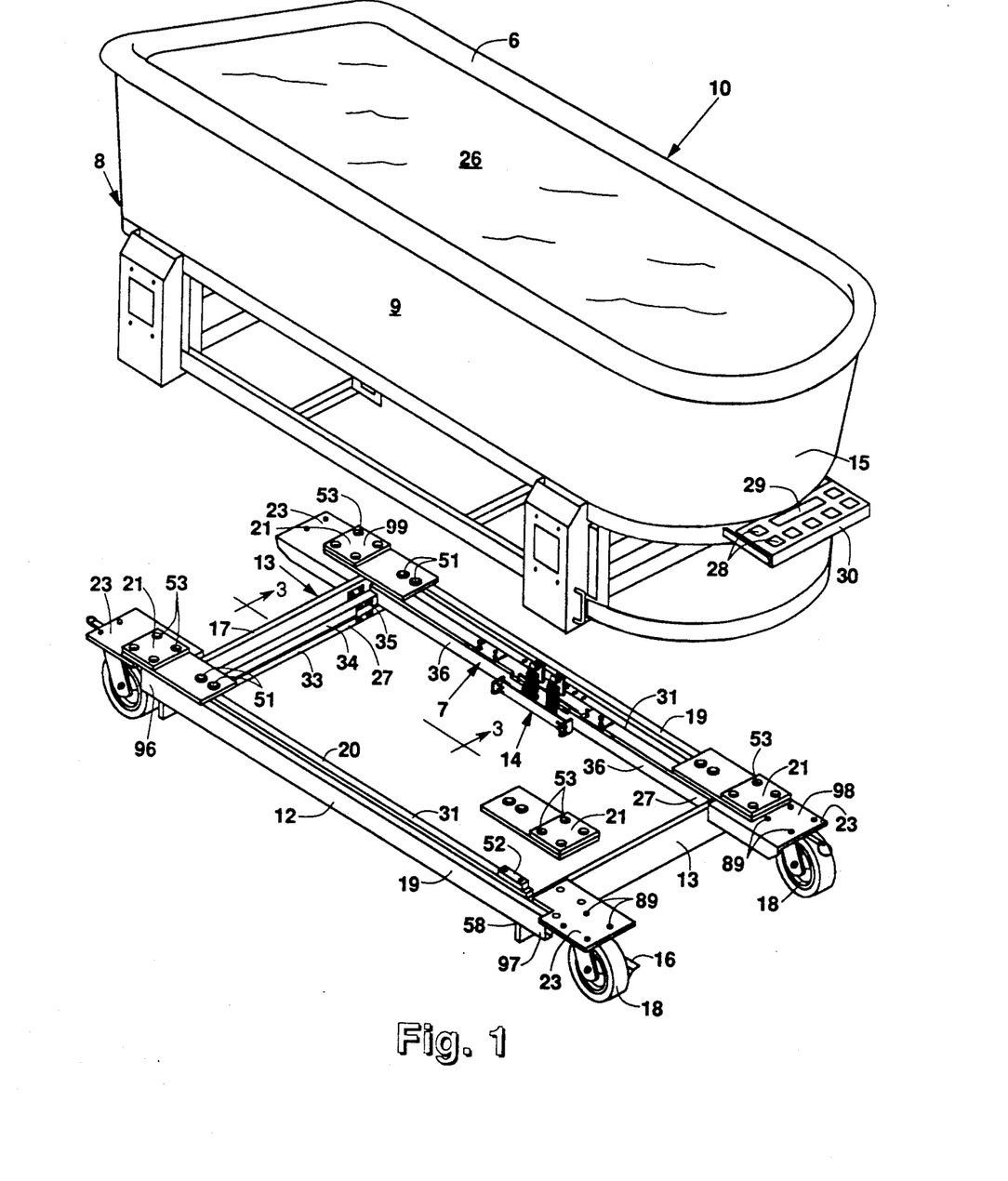
FIG. 1 shows a partially-exploded perspective view of the preferred embodiment of a bed 10 constructed according to the teachings of the present invention.

Referring to FIG. 1, bed 10 basically comprises a patient support 8, which essentially includes a tank 9, mounted atop a frame 13 which has a scale assembly 14 integrated therein. Frame 13 is supported by a plurality of casters 18. Patient support 8, itself, is the patient supporting portion of a bead bed, substantially as shown and described in Applicant's co-pending application Ser. No. 217,685 which was filed Jul. 11, 1988, the disclosure of which is incorporated herein by reference as though set forth in its entirety. The tank 9 of patient support 8 contains a granular material as is characteristic of bead beds and has a patient support surface in the form of a cover sheet 26 over the top of the granular material. The cover sheet 26 is attached around its perimeter to the upper rim 6 of tank 9. Bed 10 is substantially symmetrical about a vertical plane which is centrally located and traversely-oriented with respect to bed 10.

A control panel 30 provides a human interface which enables an operator of bed 10 to control its operation in a manner described more fully below. Control panel 30 is mounted to tank 9 at the foot 15 of tank 9. The control panel 30, itself, comprises a microprocessor-based controller for controlling the operation of the bed 10 according to input or according to a previously stored program. The controller of control panel 30 could be alternatively embodied in a variety of other forms, such as in a state machine of discrete circuitry components. Buttons 28 are provided on control panel 30 as one means of input to the controller of panel 30 and as means for selecting previously stored programs. A liquid crystal display 29 is also provided on control panel 30 for displaying information for an operator of bed 10. The display 29 preferably includes a digital readout but could include either digital readout or analog readout. Display 29 could also be embodied in the form of an LED display or other equivalents. Among the information displayed on liquid crystal display 29 is a value for the weight of a patient supported on bed 10, determined based on output from scale assembly 14 of frame 13 in a manner also described further herein. As an alternative, control panel 30 and/or the control means for scale assembly 14 could be separated from the fluidization controls, such as by mounting the controls for fluidization in a separate panel (not shown) or embodying them in a discrete processor within the same panel 30.

Figure 2:
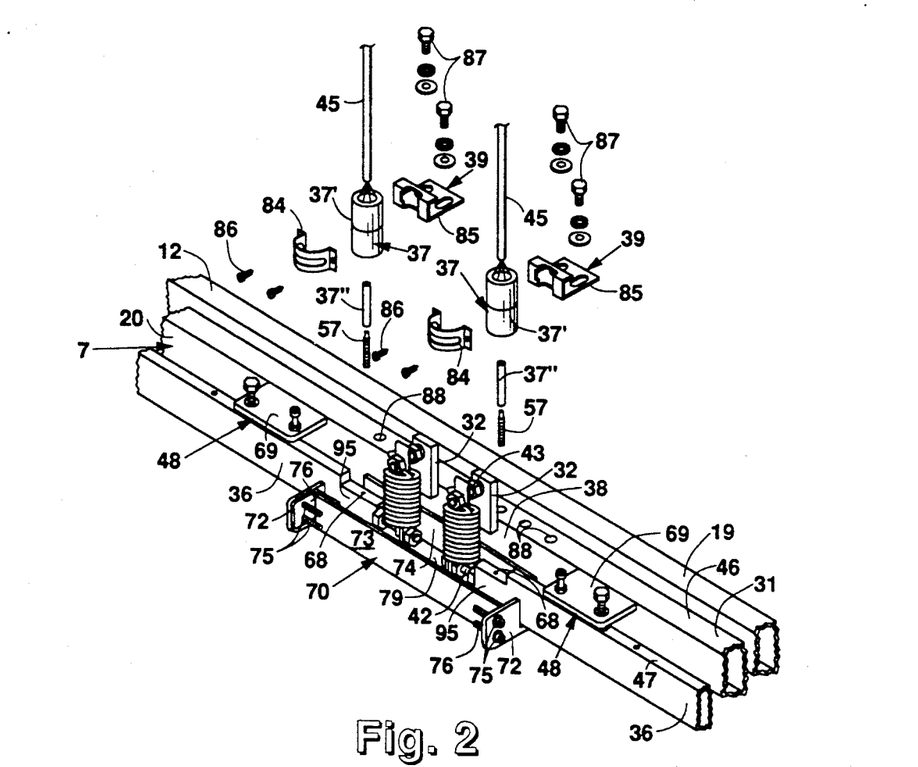
FIG. 2 shows a partially-exploded, partially cut-away detail of portions of the scale assembly 14 of bed 10.

Scale assembly 14 is included in frame 13 for determining the weight of a patient supported on bed 10. Referring to FIG. 2, portions of scale assembly 14 are shown in more detail. The scale assembly 14 includes a support frame 12 and a load frame 20, which are slightly movable with respect to each other in the vertical direction. The support frame 12 is a substantially rectangular frame of rigid construction. Support frame 12 includes longitudinal beams 19 and transverse beams 17. The transverse beams 17 are welded, or otherwise rigidly joined, to the longitudinal beams 19 at the ends thereof.

Support frame 12 also has rigid plates 23 rigidly connected at each of its four corners for mounting of casters 18 on the undersides thereof. The plates 23 are substantially horizontal and are connected to longitudinal beams 19 by means of common bolts and nuts. Casters 18 are conventional casters provided to enable movement of bead bed 10 on the ground 100. Casters 18 are mounted to plates 23 by means of bolts 89 with mating nuts. Casters 18 preferably incorporate locking mechanisms 16 for selectively locking the wheels thereof in place to prevent rolling.

Figure 3:
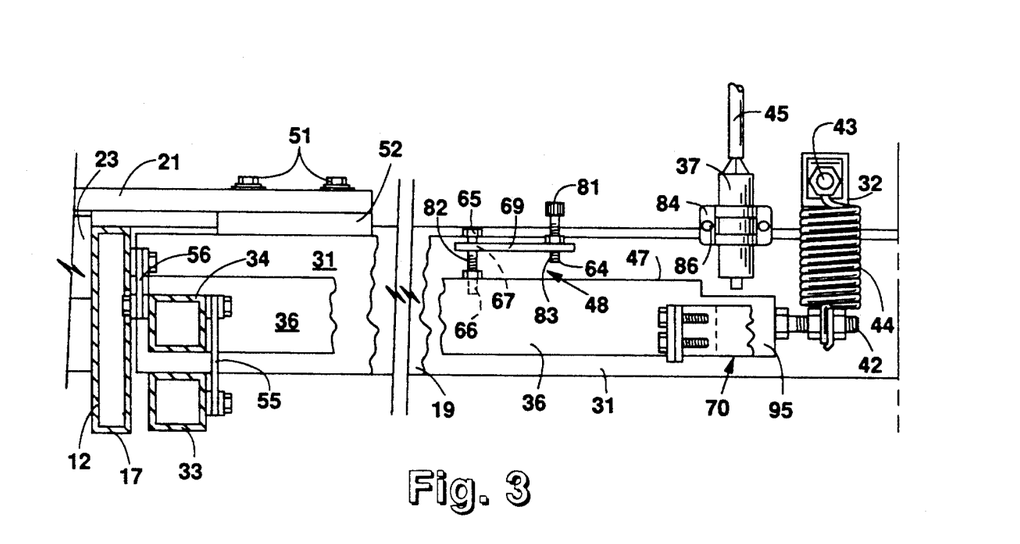
FIG. 3 illustrates one half of the frame 13 of bed 10 in a partially cut-away, elevational view taken along the sagital plane 3—3 shown in FIG. 1.

The load frame 20 is also substantially rectangular in shape and includes a pair of parallel, longitudinally disposed rails 31. In addition, the load frame 20 includes a pair of transverse bars 33 which are connected to and between rails 31 at each longitudinal end of the load frame 20. Four platforms 21 are also provided, one platform 21 being mounted to load frame 20 at each corner 96-99 of frame 13. The patient support 8 of bed 10 is mounted to load frame 20 by means of bolts (not shown) positioned through holes 53 in each of platforms 21 and threadably engaged with the underside of patient support 8. Each of platforms 21 are rigidly secured to load frame 20 by means of bolts 51. Referring to FIG. 3, for example, the platform 21 shown is secured to the rail 31 by means of bolts 51. Bolts 51 pass through holes (not shown) in the platform 21, though matching holes in spacer 52 and, then, are threadably engaged in threaded bores into the top surface 46 of rail 31. Spacers 52 are mounted to load frame 20 in this manner at each of the corners 96-99 of frame 13.

The scale assembly 14 also includes a pair of displacement transmitting members 27, including bars 34 and beam arms 36. Bars 34 are located at the opposite ends of load frame 20. Each of bars 34 is connected between one of transverse beams 17 and one of transverse bars 33 via pairs of support flexures 55 and load flexures 56 in a manner as is known in the art of scales for other applications. Thus, in conformance with the language of such art, each of beams 17 serves as a support bar, and each of bars 33 serves as a load bar. A beam arm 36 is connected to each displacement bar 34 in a cantilevered manner at the end 35 of the bar 34 which is adjacent the far side 7 of load frame 20. Each beam arm 36, in turn, cooperates with a signal emitting means 37 which serves to emit signals corresponding to vertical displacement of the distal end 95 of the respective beam arm 36. The emitted signals vary depending on the weight of a patient on bed 10.

Springs 44 are also connected to the distal ends 95 of beam arms 36 to oppose torque induced on beam arms 36 by the load transferred from load frame 20 to support frame 12. Each beam arm 36 has a pin 42 extending coaxially from its distal end. The longitudinal rail 31 on the far side 7 of load frame 20 has a pair of pins 43 protruding perpendicularly therefrom in positions such that each pin 43 is positioned to cross directly above one of pins 42 so that the central axes of springs 44, which span therebetween, are vertical axes. To provide for a profile of minimal height of scale assembly 14 while also providing a sufficient distance between pins 42 and 43 to allow operative placement of springs 44, pins 43 are actually connected to load frame 20 by means of upstanding members 32 welded to rails 31 near the upper edges 38 thereof. Each member 32 spaces the respective one of pins 43 above the rail 31 on the far side 7 of load frame 20.

Tension springs 44 are mounted between pins 42 and 43. The springs 44 serve to provide a neutral point for the beam arms 46 as well as to provide a torque acting between the respective beam arms 36 and the load frame 20 to oppose the torque created by transmitting the load of load frame 20 to support frame 12 through load flexures 55 and support flexures 56.

Spacers 52 (referenced above), serve to enable some downward vertical movement of platform 21 relative to support frame 12 by spacing platform 21 above plate 23. Nevertheless, each of platforms 21 is of sufficient dimensions to overlap the majority of plate 23, along with the adjacent end of a transverse beam 17 and the adjacent end of a longitudinal beam 19 of support frame 12. That overlapping characteristic of platforms 21 provides a safety precaution in the event of failure in the members which ordinarily carry the load between load frame 20 and support frame 12, particularly in the event load flexures 55 or support flexures 56 (described further herein) fail. In the event of such failure, the bed 10 would still be operational in general; however, the scale assembly 14 would probably not continue to produce an accurate readout for control panel 30. Additionally, each of plates 23 has an upper surface which is planar and each of platforms 21 has a lower surface which is planar such that loads are distributed over such planar surfaces in the event of such failure.

To maintain a relatively compact frame 13 for bed 10, and also to minimize the degree of slack movement within scale assembly 14, clearances between support frame 12, load frame 20 and displacement transmitting members 27 are relatively small. Despite those small clearances, load frame 20 is able to move slightly relative to support frame 12 in the vertical direction and, as a result of such movement, load flexures 55 and support flexures 56 allow and provide for axial rotation of displacement transmitting bars 34. The scale assembly 14 functionally enables determination of the magnitude of the load supported between platforms 21 and casters 18 (shown in FIG. 1). In essence, as the load on platforms 21 increases, the load is transmitted from platforms 21 to longitudinal rails 31 and transverse bars 33 which, consequently, are biased downwardly relative to longitudinal beams 19 and transverse beams 17 of support fame 12. The ends of transverse bars 33 are positioned beneath and welded to the underside of longitudinal rails 31 so that the loads on platforms 21 are transmitted in complete compression from platform 21 through spacers 52 and rails 31 to bars 33. The opposite ends of transverse beams 17 are noted with notches 58 for engagement both on the side and beneath the longitudinal beams 19 of support frame 12 for further reinforcement.

From transverse bars 33, the load is transferred from load frame 20 to transverse beams 17 of support frame 12 by means of load flexures 55 and support flexures 56, which produce a torque on displacement transmitting bars 34 due to the configuration of their mounting on displacement transmitting bars 34. Such producement of torque between a load frame and a support frame is conventional in the art of scales. The torque on displacement transmitting members 34 is conveyed through beam arms 36 to the distal ends 95 thereof. At each of the distal ends 95, a spring 44 is provided to oppose such torque.

Referring to FIG. 2, each signal emitting means 37 is preferably in the form of a linear variable differential transformer (LVDT) 37. The LVDT's 37 are located adjacent the distal ends 95 of beam arms 36. Each LVDT 37 includes a coil 37' which is mounted in a telescopic fashion around core 37". The coil 37' of each LVDT 37 is fixed via a suitable bracket assembly 39 to the longitudinal rail 31 on the far side 7 of load frame 20. Bracket assemblies 39 preferably include U-shaped brackets 84 and L-shaped brackets 85. The U-shaped brackets 84 are secured to L-shaped brackets 85 by means of self-tapping screws 86 in a manner which clamps the coils 37' between the respective brackets 84 and 85. The brackets 85, in turn, are secured to the upper surface 46 of the rail 31 on the far side 7 by means of screws 87, which are threadably engaged with threaded bores 88 in the upper-surface 46 of the rail 31. Coils 37' are oriented with vertical central axis.

Each core 37" is fixedly secured on a beam arm 36 via a threaded stem 57. The cores 37" fit in sleeve-like manner around stems 57 and are adhered to the exterior of the threaded stems 57. The threaded stems 57 are then threaded into a respective hole 68 near the distal end 95 of the respective beam arm 36. Each of cores 37" is substantially vertical and is perpendicular to the respective beam arm 36. Each LVDT 37 is connected via a suitable electric line 45 from the respective coil 37' to control panel 30 for processing signals output by the LVDT 37.

Limit assemblies 48 are provided for limiting the upward and downward movement of the distal ends 95 of beam arms 36. Referring to FIG. 3, each limit assembly 48 is preferably embodied to include limit screws 81 and 82. Limit screw 81 provides an upper limit for the movement of beam arm 36. Limit screw 81 is threadably engaged through a threaded bore in an ear 69. Each ear 69 (one corresponding to each of limit assemblies 48) protrudes horizontally from the longitudinal rail 31 of the far side 7 of load frame 20, protruding directly over the beam arm 36 which is limited. Thus, screws 81 and 82, which are vertically oriented, are positioned to operatively engage the upper surface 47 of the respective beam arm 36. Turning limit screw 81 about its shank 83 allows an operator to adjust the upper limit of the movement of beam arms 36 by adjusting the height of the lower end 64 of the shank 83 of screw 81 relative to the respective ear 69. Each ear 69 is rigidly connected to load frame 20.

Limit screw 82 serves as a lower limit for the vertical movement of beam arm 36. In contrast to screw 81, screw 82 is threadably engaged in a threaded bore 66 in the top surface 47 of beam arm 36. The limiting effect of screw 82 is effectuated by the head 65 thereof when head 65 abuts the perimeter of a hole 67 through which screw 82 passes through ear 69. Hole 67 has a slightly smaller diameter than head 65. As will be obvious, head 65 can be adjusted up or down relative to beam arm 36 by turning screw 82 to screw it in or out, respectively, of bore 66. With the head 65 of screw 82 higher, the distal end 95 of beam arm 36 is able to travel lower before head 65 engages ear 69. Vice versa, the higher that limit screw 81 is positioned, the higher the distal end 95 of beam arm 36 is allowed to move in the vertical direction.

One problem with LVDT in the field is that non-vertical movement of core 37" relative to transformer coil 37' may not only cause inaccurate readouts but, in addition, may damage LVDT 37. To address this problem, a lower guard is provided in the form of a single U-shaped channel 70. A single U-shaped channel provides sufficient protection for both of LVDT 37 while also shielding springs 44 and LVDT 37 from obstruction, interference and other hazards. U-shaped channel 70 is rigidly mounted on the rail 31 on the far side 7 of load frame 20. Referring to FIG. 2, U-shaped channel 70 essentially defines a vertical slot 71 within which each of beam arms 36 is able to move in the vertical direction. Nevertheless, the definition of slot 71 prevents movement of the distal ends 95 of beam arms 36 is lateral directions. Channel 70 comprises a pair of U-shaped collars 72 and a pair of parallel plates 73 and 74. Collars 72 are perpendicular to plates 73 and 74 and are welded to plate 74 at its opposite ends. Plate 74 is, in turn, positioned flush on the surface of longitudinal collars 72 and is secured to plate 73 at the opposite ends thereof by means of bolts 75 and L-shaped brackets 76. More particularly, L-shaped brackets 76 are welded to plate 73 at its opposite longitudinal ends, and brackets 76 are secured to collars 72 by means of bolts 75. Thus, with plate 73 being parallel to plate 74, a central space 78 is defined by U-shaped channel 70, within which the distal ends 95 of beam arms 36 are confined.

The master control of the preferred embodiment is contained in control panel 30, which is powered by an electrical wall outlet available in hospitals. In the preferred embodiment, the master control includes circuitry and software for analyzing the return signals from the LVDT 37 to determine the weight of a patient supported on the support surface 26 of bed 10. The master control also includes features for controlling fluidization of bed 10. Further definition of the control will be apparent to those of ordinary skill in the art in light of the following description of the method by which such determination is performed.

Figure 4:
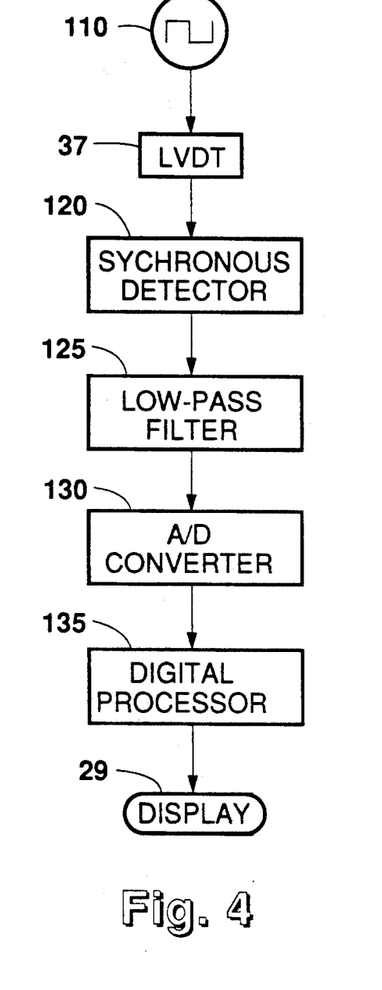
FIG. 4 shows a block diagram of the signal processing features of bed 10, evidencing a method of the invention as well.

Referring to FIG. 4, the signal processing method of the master control of panel 30 is shown in relation to LVDT 37 in block-diagram form. When operative, circuitry of the master control generates a signal for transmission in a circuit from panel 30 to LVDT and back to panel 30. The signal is generated by a square wave generator 110. An identical signal is transmitted to each of LVDT 37 by means of lines 45 (shown in FIG. 2). The pulse amplitudes of the return signals from LVDT 37 are proportional to linear displacements between the LVDT coils 37' and the respective cores 37''. The LVDT 37 are callibrated in conjunction with the master control such that the pulse amplitude is perceived by the master control as zero when the weight on bed 10 is zero. Upon reception by control panel 30, the return signals from the LVDT 37 are added to produce a single signal, which is representative of the average of the displacements of the two LVDT 37. The combined return signal is then rectified by a synchronous detector 120. Then, the rectified signal is filtered by a low-pass analog filter to produce an output signal having a voltage which is proportional to the average linear displacement of the two LVDT coils 37' relative to their respective cores 37''. The filtered signal is then sampled by an analog-to-digital (A/D) converter to produce a series of discrete digital representations (or "samples") which are proportionate to displacement between the coils 37' and the cores 37'' at discrete points in time.

As mentioned, the fluidization of a bead bed creates vibrations far more significant than in other air fluidized beds such as low air loss beds due, in large part, to the solid nature of the material being fluidized. Without such vibrations, the output voltage for a given patient would be a constant voltage proportional to the weight of the patient. However, the vibrations of fluidization cause the filtered signal to have an unsteady voltage, especially due to the sensitivity required to accurately detect the weight of a normal patient which is relatively small in comparison to the weight of support 8. Consequently, when that signal is converted into a digital signal by means of A/D converter 130, the result is a series of discrete digital signals having fluctuating values which, in turn, produce a readout not indicative of the patient's actual weight.

To compensate for effects of the fluidization of the bead bed 10 in combination with the required sensitivity of LVDT 37 due to the weight of the patient support 8, the discrete digital representations are further processed through a digital processor 135. The digital processor 135, in effect, further filters the series of digital representations by performing a weighted average on successive digital representations in order to produce a modified digital representation of weight that can be translated and presented in a readable manner for viewing by medical personnel via display 29 of control panel 30 with sufficient accuracy. The weighted average effectuated by digital processor 135 is such that, at any point in time, the resulting digital representation ($V'_n$) has a value related to the last previous output value ($V'_{n-1}$) and the current value ($V_n$) being received from the A/D converter 130 according to the formula: $V'_n = |(k-1)V'_{n-1} + V_n]/k$, with k being a filter coefficient and n being merely an index number representing the sequential number of the representation in a sequence. The master control of panel 30 processes the resulting signal (representing $V'_n$) to determine the weight of a patient supported on the support surface 26 for display on display 29. Any of a number of equivalent digital filters could also be used to effectuate equivalent weighted averages.

In the preferred embodiment, the value for the coefficient k in the above formula is ordinarily established as the integer 128. Although weighted averages have been previously employed in processors of fields of art other than bead bed processors, it is believed that factors greater than eight have never been used in relation to hospital beds of any sort, much less bead beds. The value of 128 for the filter coefficient k provides a highly weighted average which eliminates the effects of the vibration-originated fluctuations which occur between the discrete digital representations produced by A/D converter 130. However, increasing the filter coefficient k also increases the time constant of the filter, thereby lengthening the time required for the filter output to reach its steady-state value after a step-change in its input. Thus, with k=128, for example, a steady, accurate readout on display 29 takes about thirty seconds, depending on the sampling rate, after the time when a patient is first positioned on the support sheet 26 of bed 10.

Figure 5:
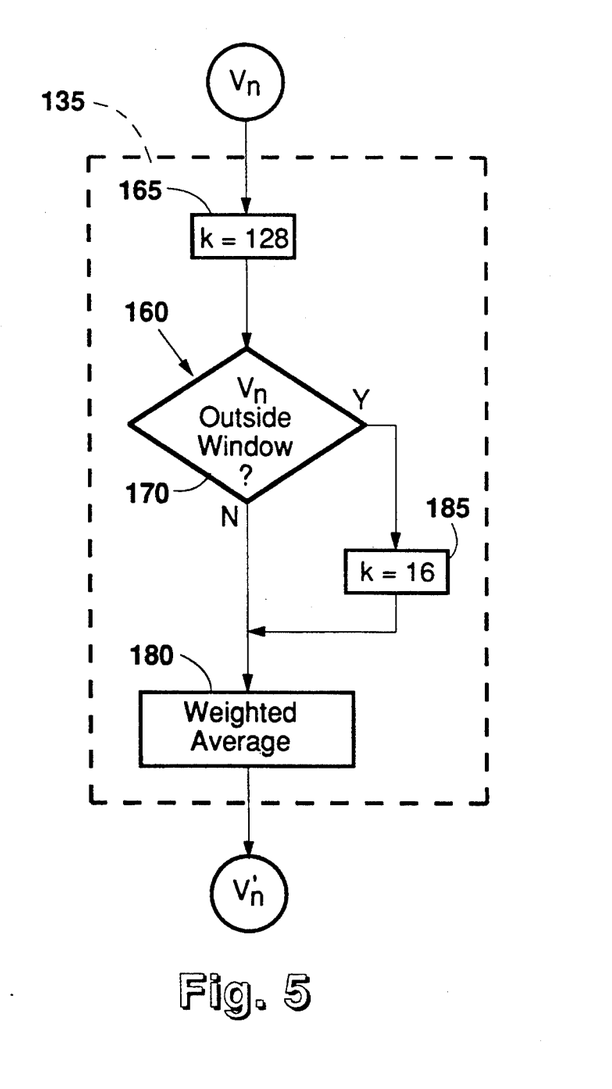
FIG. 5 shows a flow chart characteristic of the digital processor 135 of the preferred embodiment.

To speed up the time for obtaining a steady, accurate readout in such circumstances, the master controller of panel 30 is also provided with means for decreasing the value of the coefficient k when such significant weight changes are encountered. In the preferred embodiment, the means for decreasing the effective value of the filter coefficient k includes a qualifying subroutine 160, represented in FIG. 5. Referring to FIG. 5, the qualifying subroutine 160 is actually part of the logic of digital processor 135. As an alternative, the qualifying subroutine 160 could be embodied in circuitry components such as a circuit including a comparator. Qualifying subroutine 160 functions to speed up the process of obtaining a steady, accurate readout when significant changes in the weight of a patient on bed 10 are detected. More specifically, the qualifying subroutine 160 effectively speeds up the process of obtaining such a steady readout when the current value ($V_n$) being received from the A/D convertor 130 deviates from the last previous output value ($V'_{n-1}$) beyond a certain range. That certain range is emperically determined at a value great enough such that any deviations in the values ($V_n$) which are of the magnitude of those caused merely by fluidization fall within that certain range. Thus, that certain range defines what is referred to as a window about the last previous output value ($V'_{n-1}$).

In the logic of digital processor 135, the value for the filter coefficient k is normally set at a fixed value (the integer 128 in the preferred embodiment), such as indicated at step 165 of FIG. 5. As long as the value ($V_n$) being received is within the window, as determined by step 170 of qualifying subroutine 160, the weighted average 180 (previously described) performs with the normal value of the filter coefficient k, in the manner described in previous paragraphs. In contrast, if the value ($V_n$) being received from the A/D convertor 130 is determined in step 170 to be outside the window of values, the filter coefficient k is automatically decreased. Such automatic decrease is represented as step 185. In the preferred embodiment, the filter coefficient k is decreased to a value of 16 at step 185. Hence, when a change in the weight supported on bed 10 is significant enough to create a deviation in the value ($V_n$) such that qualifying subroutine 160 determines that it is outside the window defined by step 170, the digital processor 135 is adjusted to change the output value ($V'_n$) more rapidly.

As an alternative, the qualifying subroutine 160 could be substituted by a manually-actuable means, such as a button on control panel 30 which is adapted to cooperation with the master control thereof, such that, when the button is depressed the value of the filter coefficient k is temporarily decreased. In such an alternative, when a patient is placed on the supporting surface 26, an operator may choose to depress the specified button to temporarily decrease the value of k. After a brief period of time following such depression, the master control would again set the value for the filter coefficient k equal to the preset value of 128. As a result, the readout on control panel 30 approaches the actual weight of a patient supported on surface 26 much more quickly than if k remained set at 128, while the full benefits of the highly-weighted average of digital filter 135 can still be appreciated, although much more quickly, as the coefficient k returns to the greater value (i.e., 128 in the preferred embodiment). Other equivalent means for speeding up the time for obtaining a readout on display 29 in such circumstances are also invisioned.

Others of buttons 28 on control panel 30 are provided to manipulate the master control for commonly desirable functions such as calibration.

Alternatively, the fluidization of bead bed 10 is temporarily turned off for a sufficient period of time for vibrations caused by fluidization to cease in order for the output signals from LVDT 37 to stabilize. Thus, a steady and accurate reading of the patient's weight is provided on display 29 without the need to implement the digital processor and other features of the master control. A timer is provided in control panel 30 and linked with the fluidization control to effectuate the temporary de-fluidization. The timer is actuated by pressing one of buttons 28 which is dedicated for this purpose. In the preferred embodiment, the timer is set to pause the fluidization of bed 10 for a period of 30 seconds, although it is anticipated that other times will be effective for the same purpose. While this temporary defluidization process is effective to minimize the effects of vibrations, it requires medical personnel to wait by the bed during the off mode to obtain a patient weight and does disturb the patient because it involves a fluidized mode, a non-fluidized mode and refluidizing of bed 10. Accordingly, utilization of the signal processing features of the master control is far more preferable.

From the foregoing, it will also be apparent to one of ordinary skill with respect to fluidized bead beds that the present invention is one well adapted to attain all of the results and objects here and above set forth together with other features and objects which are inherent or otherwise obvious from a description of the apparatus and the method thereof.

Although the present invention has been disclosed in terms of the foregoing preferred embodiment, other alternatives, features and advantages of this invention will be apparent to those of ordinary skill in the art. It is thus understood that the apparatus and method here and before illustrated and described are given only by way of example and maybe very widely within the scope of the invention, which is defined by the appended claims.

I claim:

1. A bead bed adapted for weighing a patient lying thereon, comprising:
   a frame;
   a bead bed support mounted atop said frame;
   said bead bed including a tank having a porous diffuser board supporting a mass of granular material, a cover sheet and a compressor for fluidizing the granular material to support a patient thereon to cure and prevent bedsores;
   a scale integrated with said frame for determining the weight of a patient lying on said support;
   a signal emitting means mounted to said frame for emitting signals which are representative of a load supported by said frame;
   a signal processing means for determining the weight of the patient lying on said support based on the signals emitted by said signal emitting means; and
   output means for providing a continuous readout of the weight determined by said scale.

2. The bead bed of claim 1, wherein the integration of said scale with said frame comprises:
   a load frame;
   a support frame;
   a pair of displacement transmitting members disposed at opposite ends of said support frame;
   a plurality of load flexures, each of said load flexures connecting said load frame to a respective one of said displacement transmitting members to transfer the weight of said load on said load frame to said member;
   a plurality of support flexures connecting each member to said support frame for transferring the weight of said load to said support frame and causing a proportionate torque to be induced on said members, said support flexures enabling each of said members to pivot under an applied weight of said load under said load frame;
   a pair of beam arms, each arm being secured to a respective one of said members to pivot about a horizontal axis of the respective one of said members in response to the torque induced on said members;

a pair of springs, each spring being mounted on said load frame and secured to each beam arm at a distal end thereof to elastically restrain movement of each respective beam arm relative to said load frame; and a pair of linear variable differential transducers mounted upon said support frame for emitting signals corresponding to vertical displacement of the distal end of a respective beam arm relative to said load frame.

3. The bead bed of claim 2 further comprising:
means for translating the signals from said transducers into a user-readable representative of the weight of the patient supported on said support.

4. The bead bed of claim 2, wherein:
said support frame comprises a plurality of horizontally oriented plates spaced around the perimeter of said support frame; and
said load frame comprises a plurality of platforms spaced about the perimeter of said low frame, each of said platforms being positioned slightly above a corresponding one of said plates.

5. The apparatus of claim 2, further comprising:
limit means for limiting the upward and downward movement of the distal ends of said beam arms; and
a U-shaped channel defining a slot therein for restricting lateral movement of the distal ends of each said beam arms.

6. The bead bed of claim 5, wherein:
said U-shaped channel is rigidly mounted to said load frame equidistantly from each of said displacement transmitting bars.

7. A frame for a bead bed support having a scale integrated therein for determining the weight of a patient support;
a load frame for engaging and supporting a bead bed support;
a support frame;
a pair of displacement transmitting members disposed at opposite ends of said support frame;
a plurality of load flexures, each of said load flexures connecting said load frame to a respective one of said displacement transmitting members to transfer the weight of said load on said load frame to said member;
a plurality of support flexures connecting each member to said support frame for transferring the weight of said load to said support frame and causing a proportionate torque to be induced on said members, said support flexures enabling each of said members to pivot under an applied weight of said load under said load frame;
a pair of beam arms, each arm being secured to a respective one of said members to pivot about a horizontal axis of the respective one of said members in response to the torque induced on said members;
a pair of springs, each spring being mounted on said load frame and secured to each beam arm at a distal end thereof to elastically restrain movement of each respective beam arm relative to said load frame; and
a pair of linear variable differential transducers mounted upon said support frame for emitting signals corresponding to vertical displacement of the distal end of a respective beam arm relative to said load frame, the signals emitted from said transducers being in the form of pulses having an amplitude which is related to the vertical displacement of the distal end of the respective beam arm relative to said load frame;
translating means comprising a synchronous detector and a low-pass filter for processing the analog signals from said transducers, producing a processed analog signal;
an analog-to-digital converter for converting the processed analog signal into a digital signal including a series of discrete digital representations; and
a digital filter for filtering said digital signal to effectuate a weighted average characterized by a coefficient k.

8. The bead bed support frame of claim 7 wherein said coefficient k characterizing said digital filter has a value greater than or equal to 16.

9. The bead bed support frame of claim 7 wherein said coefficient characterizing said translating means has a first value equal to or greater than 100 and a second value less than 100, wherein said second value characterizes said translating means upon actuation of a button for a brief period of time and, upon termination of said period of time, said weighted average is again characterized by said first value.

10. A bead bed adapted for weighing a patient lying thereon, comprising:
a frame;
a bead bed support mounted atop said frame;
a scale integrated with said frame for determining the weight of a patient lying on said support, the integration of said scale with said frame comprising:
a signal emitting means mounted to said frame for emitting signals which are representative of a load supported by said frame;
a signal processing means for determining the weight of the patient lying on said support based on the signals emitted by said signal emitting means;
output means for providing a continuous read-out of the weight determined by said scale;
a load frame;
a support frame;
a pair of displacement transmitting members disposed at opposite ends of said support frame;
a plurality of load flexures, each of said load flexures connecting said load frame to a respective one of said displacement transmitting members to transfer the weight of said load on said load frame to said member;
a plurality of support flexures connecting each member to said support frame for transferring the weight of said load to said support frame and causing a proportionate torque to be induced on said members, said support flexures enabling each of said members to pivot under an applied weight of said load under said load frame;
a pair of beam arms, each arm being secured to a respective one of said members to pivot about a horizontal axis of the respective one of said members in response to the torque induced on said members;
a pair of springs, each spring being mounted on said load frame and secured to each beam arm at a distal end thereof to elastically restrain movement of each respective beam arm relative to said load frame;

a pair of linear variable differential transducers mounted upon said support frame for emitting signals corresponding to vertical displacement of the distal end of the respective beam arm relative to said load frame;

limit means for limiting the upward and downward movement of the distal ends of said beam arms; and a U-shaped channel defining a slot therein for restricting lateral movement of the distal ends of each said beam arms.

11. A bead bed adapted for weighing a patient lying thereon, comprising:

a frame;

a bead bed support mounted atop said frame;

a scale integrated with said frame for determining the weight of a patient lying on said support, the integration of said scale with said frame comprising:

a signal emitting means mounted to said frame for emitting signals which are representative of a load supported by said frame;

a signal processing means for determining the weight of the patient lying on said support based on the signals emitting means;

output means for providing a continuous read-out of the weight determined by said scale;

a load frame;

a support frame;

a pair of displacement transmitting members disposed at opposite ends of said support frame;

a plurality of load flexures, each of said load flexures connecting said load frame to a respective one of said displacement transmitting members to transfer the weight of said load on said load frame to said member;

a plurality of support flexures connecting each member to said support frame for transferring the weight of said load to said support frame and causing a proportionate torque to be induced on said members, said support flexures enabling each of said members to pivot under an applied weight of said load under said load frame;

a pair of beam arms, each arm being secured to a respective one of said members to pivot about a horizontal axis of the respective one of said members in response to the torque induced on said members;

a pair of springs, each spring being mounted on said load frame and secured to each beam arm at a distal end thereof to elastically restrain movement of each respective beam arm relative to said load frame;

a pair of linear variable differential transducers mounted upon said support frame for emitting signals corresponding to vertical displacement of the distal end of a respective beam arm relative to said load frame;

limit means for limiting the upward and downward movement of the distal ends of said beam arms;

a U-shaped channel defining a slot therein for restricting lateral movement of the distal ends of each said beam arms; and said U-shaped channel is rigidly mounted to said load frame equidistantly from each of said displacement transmitting bars.

* * * * *